US005514286A

United States Patent [19]
Crosby

[11] Patent Number: 5,514,286
[45] Date of Patent: May 7, 1996

[54] THERMAL DESORPTION UNIT

[75] Inventor: Richard A. Crosby, Pearland, Tex.

[73] Assignee: ETG Environmental, Blue Bell, Pa.

[21] Appl. No.: 145,486

[22] Filed: Oct. 29, 1993

[51] Int. Cl.[6] .................................................. B01D 35/01
[52] U.S. Cl. .......................... 210/742; 210/771; 210/774; 210/241
[58] Field of Search ........................ 210/770, 774, 210/771, 180, 181, 661, 742, 806, 241; 110/346, 226, 203, 345; 34/80, 92; 95/902; 405/128

[56] References Cited

U.S. PATENT DOCUMENTS

| | | | |
|---|---|---|---|
| 3,554,143 | 1/1971 | Rodgers | 110/203 |
| 3,859,933 | 1/1975 | Von Klenck | 110/8 R |
| 3,991,481 | 11/1976 | Coraor et al. | 34/28 |
| 4,038,152 | 7/1977 | Atkins | 201/2.5 |
| 4,202,282 | 5/1980 | Hobbs et al. | 110/346 |
| 4,235,676 | 11/1980 | Chambers | 48/209 |
| 4,245,570 | 2/1981 | Williams | 110/238 |
| 4,301,750 | 11/1981 | Fio Rito et al. | 110/346 |
| 4,402,274 | 9/1983 | Meenan et al. | 110/346 |
| 4,546,711 | 10/1985 | Kerwin | 110/246 |
| 4,699,721 | 10/1987 | Meenan et al. | 210/771 |
| 4,738,205 | 4/1988 | Noland | 110/346 |
| 4,765,255 | 8/1988 | Chiarva | 110/226 |
| 4,778,606 | 10/1988 | Meenan et al. | 210/771 |
| 4,864,942 | 9/1989 | Fochtman et al. | 110/226 |
| 5,011,329 | 4/1991 | Nelson et al. | 405/128 |
| 5,027,721 | 7/1991 | Anderson | 110/236 |
| 5,052,858 | 10/1991 | Crosby et al. | 405/128 |
| 5,103,578 | 4/1992 | Rickard | 34/92 |
| 5,114,497 | 5/1992 | Johnson et al. | 210/922 |
| 5,127,343 | 7/1992 | O'Ham | 110/233 |
| 5,190,405 | 3/1993 | Vinegar et al. | 210/747 |
| 5,199,354 | 4/1993 | Wood | 110/346 |
| 5,224,432 | 7/1993 | Milsap, III | 110/236 |
| 5,228,803 | 7/1993 | Crosby et al. | 405/128 |
| 5,230,167 | 7/1993 | LaHoda et al. | 34/75 |
| 5,281,258 | 1/1994 | Markovs | 95/902 |

Primary Examiner—Frank Spear
Attorney, Agent, or Firm—Howard & Howard

[57] ABSTRACT

An improved method and apparatus for removing chemical contaminants from soil. Contaminated soil is loaded and hydraulically sealed in the treatment vessel. A vacuum is placed on the material, which is indirectly heated through the heat transfer plate from a natural gas of propane fired burner located under the plate. As the material is heated, contaminants are vaporized and flow through the vacuum discharge pipe toward the condenser unit. Vapors are cooled in the condenser through a series of refrigerated condensing coils where the vaporized material is converted back to a liquid and discharged to a liquid recovery vessel. After treatment, material is downloaded into a roll-off type container for post-treatment analysis and cool down prior to recycling or backfilling. Recovered liquids are recycled or sent to an appropriate facility. Process time is typically 45 minutes to an hour for a six cubic yard batch. The system is self-contained, mobile, and operable by a two-person crew.

24 Claims, 4 Drawing Sheets

THERMAL DESORPTION UNIT

FIELD OF THE INVENTION

The present invention relates to a method and apparatus for removing chemical contaminants from soil, and more particularly to apparatus and methods of desorption of chemical contaminants from soil under vacuum conditions.

BACKGROUND OF THE INVENTION

The present invention is directed to an apparatus and method for removing chemical contaminants, such as petroleum hydrocarbon, from soil, as a means for the environmental clean up of a dump site, landfill, or spill site.

Environmental laws require that remedial measures be taken in dump sites, landfills, or following chemical spills, leakages, or other accidents. The goal of these regulations is to prevent chemicals from contaminating ground water due to percolation of contaminates through the soil. These chemical contaminants can include hazardous and non-hazardous materials such as crude oil, hydraulics, mercury, glycol and creosote, as well as gasoline and other volatile organic compounds. The remedial measures may involve removing such compounds from the soil by volatilization. Such volatilization can readily be accomplished by heating the soil in a furnace. However, this method requires that the soil be transported to a suitable processing facility for treatment. For all but very small clean ups, this method is prohibitively expensive in view of the high transportation costs required.

Transportable methods and apparatus exist which thermally remove chemical contaminates from the soil. The problem with these units is that once the chemical contaminates are volatilized they are vented to the atmosphere, sacrificing air quality to improve soil quality.

DESCRIPTION OF THE PRIOR ART

Applicant is aware of the following U.S. Patents concerning process and apparatus for removing chemical contaminants from soil.

| U.S. Pat. No. | Inventor | Issue Date | Title |
| --- | --- | --- | --- |
| 4,864,942 | FOCHTMAN et al. | 09-17-1989 | PROCESS AND APPARATUS FOR REMOVING VOLATILE ORGANIC COMPOUNDS FROM SOIL |
| 5,052,858 | CROSBY et al. | 10-01-1991 | APPARATUS AND METHOD FOR THERMALLY STRIPPING VOLATILE ORGANIC COMPOUNDS FROM SOIL |
| 5,103,578 | RICKARD | 04-14-1992 | METHOD AND APPARATUS FOR REMOVING VOLATILE ORGANIC COMPOUNDS FROM SOIL |
| 5,228,803 | CROSBY et al. | 07-20-1993 | APPARATUS AND METHOD FOR THERMALLY STRIPPING VOLATILE ORGANIC COMPOUNDS FROM THE SOIL USING A RECIRCULATING COMBUSTIBLE GAS |

Fochtman U.S. Pat. No. 4,864,942 teaches apparatus for a method for economically separating organic contaminants such as volatile organic compound (VOC's) and polychlorinated biphenyls (PCB's) from inert materials such as soils or sludges. This method is effective even if the contaminants are present at low concentrations. The contaminated materials are subjected to a temperature sufficient to volatilize the organic contaminants but below the incineration temperature, with continuous removal and condensation of evolving the burst, for a period of time sufficient to effect the desired degree of separation of contaminants.

Crosby U.S. Pat. No. 5,052,858 teaches apparatus and a method for removing volatile organic compounds from soil in order to comply with environmental regulations. The apparatus is comprised of a rotating drum in which the contaminated soil is loaded. The drum contains an auger mechanism for aerating the soil. An air heater generates hot air which is directed to the drum and circulates through the soil, causing rapid volatilization of the volatile organic compound. The volatile organic compounds are then expelled to the atmosphere. The process is conducted in a batch fashion, loading and unloading the drum following each processing cycle. The apparatus is mobile and may be transported to any clean up site.

Rickard U.S. Pat. No. 5,103,578 teaches a method of removing volatile compounds, such as polychlorinated biphenyls (PCB's), which contaminate soil without incineration, by placing the contaminated soil into a vessel heating the soil to a temperature in a range to 300° to 600° F., preferably in the presence of an inert gas, drawing a vacuum on the vessel to such a degree as to cause the contaminant to flash to a vapor. The vapor then is removed from the vessel condensed and is routed to a super vessel for disposal.

Crosby U.S. Pat. No. 5,228,803 teaches a method for thermal stripping volatile organic compounds from soil. This system includes a vessel which contaminated soil is placed into contact with hot gas. The gas is discharged from the vessel and ambient air is introduced into the gas to ensure that the gas remains combustible. A blower circulates the gas to a cyclone separator where fine soil particles and ash are removed from the gas. Next the VOC's in the gas are removed by combustion in a burner fired with supplemental fuel. A portion of the combusted gas is exhausted to the atmosphere and the remainder is recirculated to the vessel where the process is repeated.

SUMMARY OF THE INVENTION

The thermal desorption unit can extract contaminating elements leaving a clean product for recycling while recovering certain liquid contaminates for reuse. Contaminated soil is loaded and hydraulically sealed in the treatment vessel. A vacuum is placed on the material, which is indirectly heated through a heat transfer element from a natural gas, #2 fuel oil or propane fired burner. The vacuum is in place before the system heats up, and the vacuum pump is protected by a condenser, filter and molecular sieve. As the material is heated, contaminants are vaporized and flow through the vacuum discharge pipe toward a condenser unit. Vapors are cooled in the condenser through a series of refrigerated condensing coils where the vaporized material is converted back to a liquid and discharged to a liquid recovery vessel. Since the system operates under a sealed vacuum, the majority of air flow through the system is eliminated. No emissions permit is required in most states under exemptions.

After treatment, material is downloaded into a roll-off type container for post-treatment analysis and cool down prior to recycling or backfilling. Recovered liquids are recycled or sent to an appropriate facility. Process time is typically 45 minutes to an hour for an eight to ten cubic yard batch.

The system is self-contained, mobile, and operable by a two-person crew. It can process various hazardous and non-hazardous materials such as all hydrocarbons, mercury, glycol and creosote; as well as tank bottoms and sludges. Further, the process can meet best demonstrated available technology (BDAT) for most compounds. The unit is unobtrusive and can be set up quickly.

OBJECTS OF THE INVENTION

The principal object of the invention is to provide an improved method of removing chemical contaminants from soil.

A further object of this invention is to provide a method of collecting chemical contaminants that have been removed from soil for recycling or disposal.

Another object of the invention is to provide apparatus which may be fueled by the chemical contaminants removed from soil.

Another object of the invention is to provide apparatus for selectively collecting chemical contaminants after they have been removed from the soil for recycling and sale as useful chemicals.

Another object of the invention is to provide an apparatus which lowers the boiling point of many chemical contaminates so that less fuel is required for there separation from the soil.

BRIEF DESCRIPTION OF THE DRAWINGS

The foregoing and other objects will become more readily apparent by referring to the following detailed description and the appended drawings in which.

DETAILED DESCRIPTION

Figure 1:
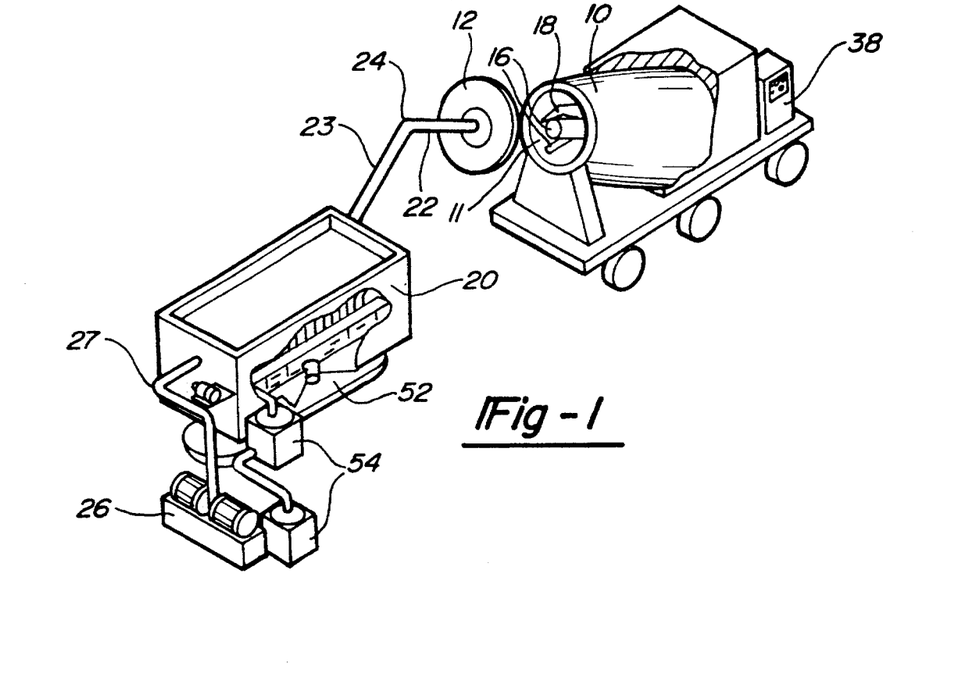
FIG. 1 is an isometric view of the thermal desorption unit.

Referring now to the drawings, and particularly to FIG. 1, the invented thermal desorption unit includes a rotary material drum 10, having a sealable chamber door 12. The rotary material drum 10 is a pressure vessel designed to ASME (American Society of Mechanical Engineers) specifications and is equipped with: a burner 14; heat tubes 16; and flights 18.

The rotary material drum 10, is an approximately cylindrically shaped vessel. In the preferred embodiment the drum 10 and the condenser unit 20 are placed on the back of a flat bed tractor trailer. However, the unit can also be configured similar to a standard cement truck type with a trailer for the condenser unit, FIG. 8, 66, such as Model Rex 770, which may be purchased from Rex Works, Inc., Milwaukee, Wis., 53201. In the preferred embodiment the drum is modified with heat transfer tubes FIG. 3, 16, a jacket 36 over cylindrical vessel to keep the heat in and a means for sealing the vessel 12. The entire vessel 10 should be engineered to ASME specifications. Preferably, the drum 10 has an axial length of approximately 15 ft., a maximum diameter of approximately 8 ft., and a useful capacity in the range of 8–10 cubic yards of soil, such dimensions making the drum suitable for ready transportation using conventional road truck tractors FIG. 8, 66. However, the principles disclosed herein are equally applicable to larger or smaller drums. The drum FIG. 1, 10 features a sealable opening 11 in its aft end, to which is attached a sealable chamber door 12. As explained further below, soil to be processed enters and exits the rotary material drum 10 through the sealable opening 11.

As shown in FIG. 1, in the preferred embodiment, the axis of the drum is inclined with respect to the horizontal at an angle in the range of about 10–15 degrees. Note that the aft end, in which the opening 11 is disposed, is higher than the front end.

Figure 3:
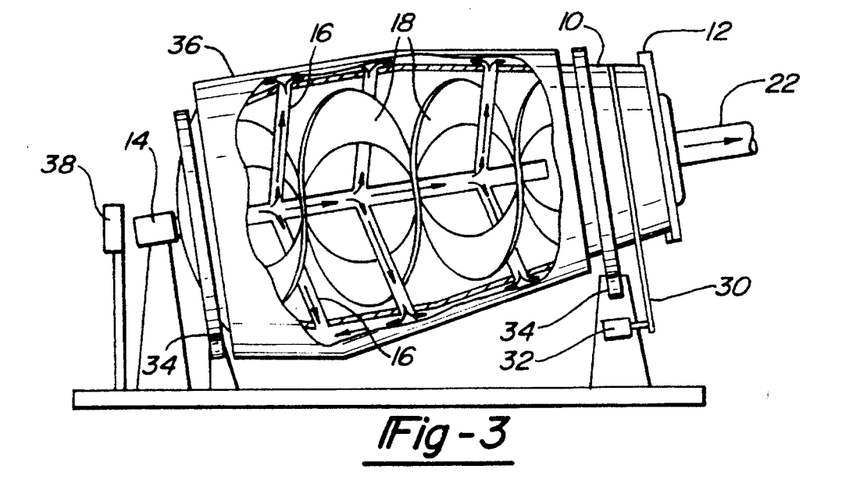
FIG. 3 is a cross sectional view of the material container.
Figure 4:
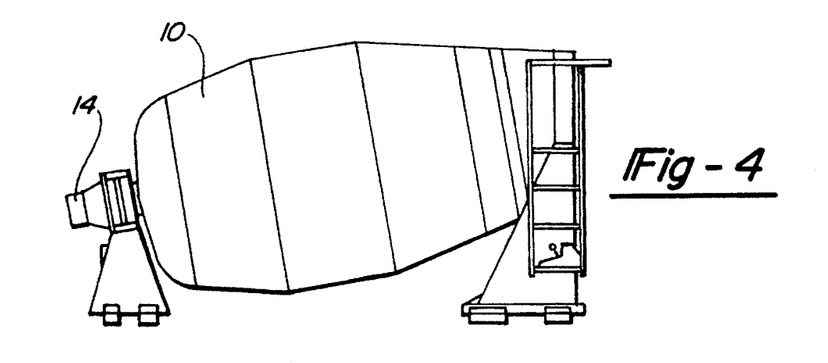
FIG. 4 is a side view of the material container.

An auger mechanism, FIG. 3, 18, is disposed within the rotary material drum 10. The auger mechanism 18 performs two important functions: one, grinding and churning of the soil and two, transporting the soil into and out of the rotary material drum 10. Since volatilization occurs through the surface of the soil particles, removal of contaminants from large clumps of soil would require prohibitively long processing times. The grinding action of the auger mechanism minimizes particle size, while increasing the surface area of the soil. Thus, pretreatment of the soil, even heavy clay-like soil, is not required. The churning action of the auger mechanism 18 constantly exposes the surfaces of the particles to the heat supplied to the drum by the heat transfer tubes 16 and the jacket 36. Because the system is run under vacuum the boiling points of the contaminates are lower, thereby allowing volatilization to take place at a lower temperature. Thus, the auger mechanism minimizes the time required for adequate volatilization.

As shown in FIG. 3, in the preferred embodiment, the auger mechanism is comprised of two continuous helical baffles 18 which extend the length of the drum and terminate at opening 11. Each helix is affixed, for example, by welding, at its periphery to the inner surface of the drum, and projects radially inward into the drum. The axis of each helix is coincident with the longitudinal axis of the drum. Both helixes are of similar configuration, that is, both are right hand or both are left hand helixes. As shown in FIG. 3, the helixes are axially offset from each other by one-half pitch. The radial height of each helical baffle varies as the drum diameter varies along the length of the drum. For a drum 10 with a maximum diameter of approximately 8 feet, the maximum radial height of the helical baffles is approximately 12–18 inches in the preferred embodiment.

Although flat baffles are shown in FIG. 3, more complex shapes, such as baffles whose inboard edges are bent at 45° or 90° to the body of the baffle, may be used to increase the churning capacity of the auger mechanism. Moreover, although two baffles are used in the preferred embodiment, as will be obvious to those skilled in the art, the auger mechanism may be comprised of a single helical baffle or three or more helical baffles similarly affixed to the drum.

Heat is introduced into the system from a burner located at the back of the rotary material drum 10 from a burner 14. Burner 14 is fired into a heat transfer tube 16 running the length of the rotary material drum 10 along its central axis, with branched members which terminate at the walls of the drum and discharged into the jacket 36, and terminates prior to opening 11. The heat transfer tubes are made from a metal alloy, such as but not limited to nickel alloys such as INCONEL which facilitates the transfer of heat from within the conduits to the soil within the material drum. These heat transfer tubes 16 also facilitate the grinding and churning actions of the auger mechanism as the material drum 10 is rotated. The hot metal from the heat transfer tubes 16 is in direct contact with contaminated soil. Additionally, the walls of material container 10 are kept at an elevated temperature through the discharge of hot air through the heat transfer tubes 16 into the jacket 36. The jacket is fitted with a damper and vent to relieve excess pressure within the unit.

The grinding and churning actions of the auger mechanism are achieved by rotating the drum, which in turn results in rotation of the auger and the heat transfer tubes 16 about its axis. This can be accomplished by using a variety of mechanism including, but not limited to, a hydraulic drive mechanism as is standard for cement trucks, or as in the preferred embodiment, a chain drive 30 attached to gear drive 32. Alternatively, the auger mechanism could be comprised of one or more helical baffles affixed at their inner edge to a shaft, whose center line is co-extensive with the longitudinal axis of the drum. In this embodiment, the drum would remain stationary and the grinding and churning action of the auger mechanism 18 would be achieved by rotating the shaft within the material drum 10. In this embodiment the burner 14 would provide heat only to the jacket 36 about the material drum 10.

As previously discussed, the auger mechanism serves to transport, as well as grind and churn the soil. Thus, rotation of the drum in one direction serves to carry the soil up the incline from the bottom of the drum and pushes it out the sealable opening FIG. 2, 11 onto a discharge chute 60. In this respect, the auger mechanism functions as a screw-type conveyor. Rotation of the drum in the opposite direction results in the aforementioned grinding and churning action. The direction of rotation, clockwise or counter clockwise, which causes the transporting and grinding, churning actions, respectively, depends on whether the auger helix is right or left handed, and may be arbitrarily chosen. As will be apparent to those skilled in the field of screw-type conveyors, the minimum pitch sufficient to efficiently carry soil out of the drum is related to the incline angle of the drum—that is, the greater the incline, the smaller the helical pitch required.

Figure 8:
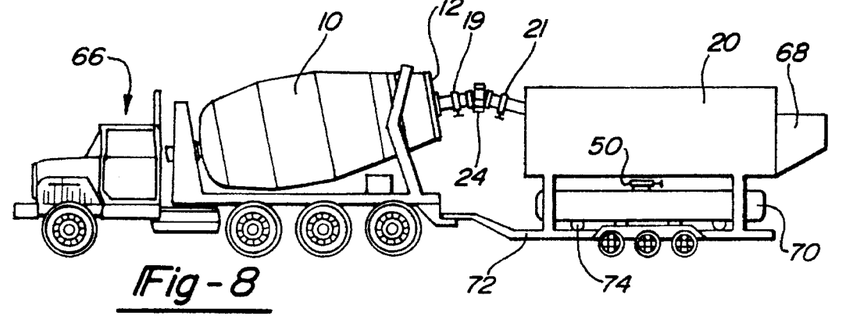
FIG. 8 is a side view of the thermal desorption unit configured for maximum mobility.

Connecting the rotary material drum, FIG. 1, 10, to the condensing unit 20 is piping 22, 23 connected by a swivel joint 24. Valve mechanisms, FIG. 8, 19 and 21, are provided before and after the swivel joint 24 to allow portions of the system to be sealed off in case of a leak. This allows the operator to minimize the emission of unwanted vapors until the leak can be repaired. A vacuum pump, FIG. 1, 26, is provided at the opposite side of the condensing unit 20, and connected to the condenser unit 20 through piping 27, to evacuate the rotary material drum 10 and facilitate transfer of contaminated vapors from the rotary material drum 10 to the condensing unit 20.

Figure 2:
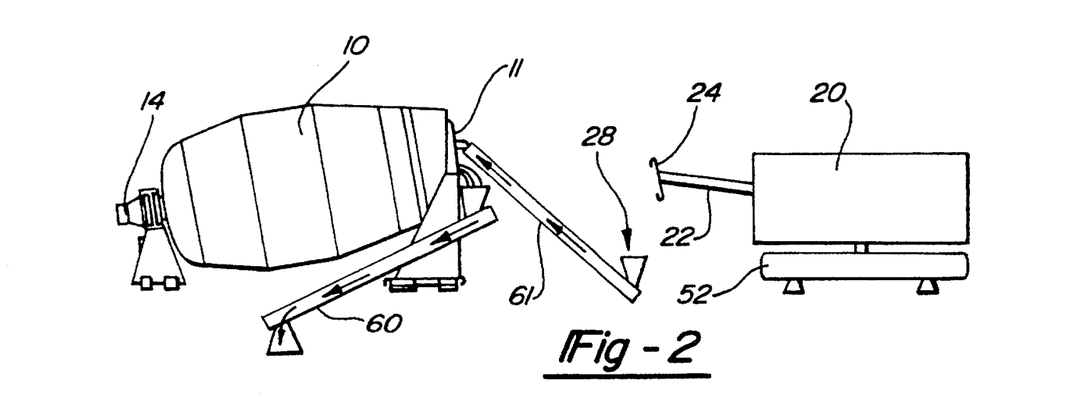
FIG. 2 is a side view of the material container and the condenser.

In operation, contaminated soil, filter cake, sludge, carbon, etc., FIG. 2, 28, is loaded in a rotary drum 10 through a conveying system 61. After the system is loaded the conveyer is moved from behind the material container 10, so that it can be sealed by a chamber door 12. Chamber door 12 seals the material container 10 so that a vacuum can be obtained on the material by evacuating the material container 10 with the vacuum pump 26. A vacuum is pulled within the system from ambient pressure to 29" Hg or 736.6 mm of Hg. The preferred vacuum being between 26"–29" Hg or 660.4 to 736.6 mm of Hg. At the preferred level of vacuum the boiling point of contaminates are lowered thus allowing these to be converted to a vapor at a lower temperature than would be required at ambient pressure.

After loading, the contaminated material 28 is agitated in the material container 10, FIG. 3, aided by the incorporation of the auger mechanism 18. A chain 30 is connected to a gear drive 32 and to the rotary material drum. The gear drive 32 turns the chain 30 which in turn rotates the drum 10 which rests on rollers 34. While the contaminated material 28 is rotating it is indirectly heated through contact with the heat transfer elements 16. These elements are made from a metal alloy, such as but not limited to nickel alloys such as INCONEL which facilitates the transfer of heat from within the conduits to the soil within the material drum. A natural gas, #2 fuel oil or propane fired burner 14 is connected to the heat transfer elements 16. In some cases the burner can be fueled off the contaminate being recovered. The burner 14 directly heats the heat transfer element which then come in contact with the contaminated material 28. Heat transfer elements 16 vent to an insulation jacket 36 which surrounds the rotary material drum 10.

During soil processing, the drum rotational speed must be maintained at the appropriate level for efficient grinding and churning action. A rotational speed which is too slow will result in most of the soil lying stagnate in the lower portion of the drum. A rotational speed which is too high will result in a centrifuge action, causing the soil to cling to the periphery of the drum. The appropriate speed for maximum grinding and churning efficiency will depend on the geometry of the auger mechanism 18 and the heat transfer tubes 16, the diameter of the drum and the density and cohesiveness of the soil. In the preferred embodiment, the rotational speed of the drum is maintained within a range of about one half (½) to eighteen (18) RPM.

The processing described above is continued until the concentration of the volatile organic compounds in the soil is reduced to an acceptable level. As those skilled in the art will recognize, the acceptable level depends on the type of organic contaminant, and may also vary with local environmental regulations, but is generally in the range of 10 PPM by weight for the volatile organic compounds associated with gasoline spills.

The length of the processing time required to reduce the concentration of volatile organic compounds to an acceptable level will depend on a variety of design, operating, and soil parameters, as will be readily apparent to those skilled in the art. As previously discussed, the design parameters include the drum size, the geometry of the auger mechanism and the heat transfer tubes and the drum incline angle. The operating parameters include the drum rotational speed, the percent of the drum volume filled with soil and the vacuum level. Soil parameters include the particle size distribution, cohesiveness, density, moisture content and temperature of the soil, as well as the contaminant type (specifically, the vapor pressure of the volatile organic compound) and its concentration level.

The burner, FIG. 3, 14, and the rotation of the rotary material box 10 is controlled by a control panel 38. As the material is heated and agitated, contaminants are vaporized and flow through the vacuum discharge pipe 22, through a valve, FIG. 5, 19, through the swivel joint 24, through vacuum discharge pipe 23, through another valve 21 toward the condenser unit 20.

Figure 5:
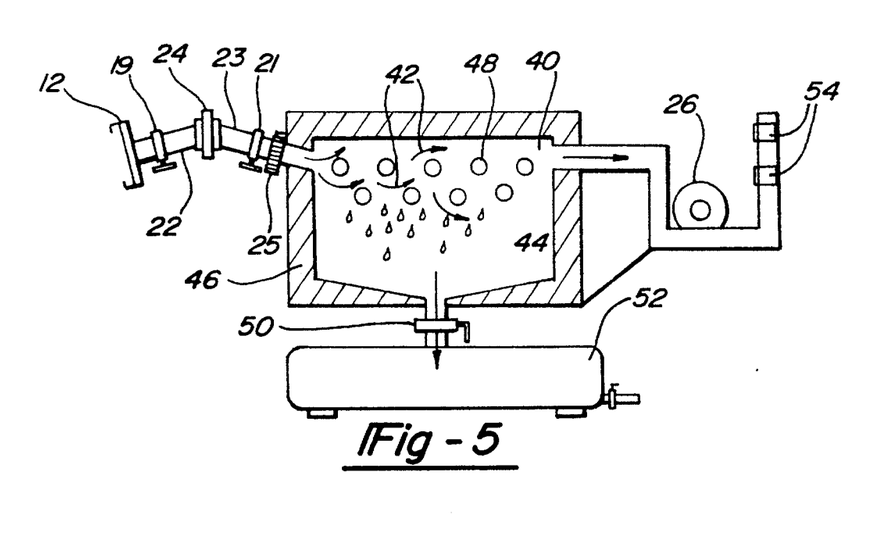
FIG. 5 is a cross sectional view of the condenser unit.
Figure 6:
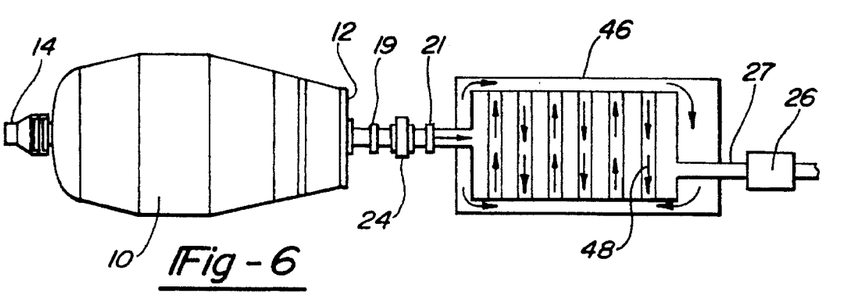
FIG. 6 is a top cross sectional view of the material container and the condenser unit.

The interior of the condenser unit 40, FIG. 5, is typically maintained at a temperature of 35° F. to 40° F., 1.67° to 4.44° C., creating an environment where all condensible vapors 42 are transformed into a liquid state 44. Temperature is maintained through the use of a refrigerated water jacket 46 surrounding the condenser unit 20. Refrigerated water also circulates throughout the interior of the condenser unit 40 through lateral conduits 48. The interaction of the condensible vapors 42 and the lateral conduit 48 facilitate condensation of the contaminates into a liquid state 44. Upon liquefying, these contaminates flow through a valve 50 at bottom of condenser into a integral holding tank 52. The holding tank, FIG. 8, 70, may be modified so that it is easily removable by providing rolling means 74 allowing the operators to easily remove tanks filled with contaminates and reattach empty tanks to minimize down time. This portion of the system is maintained under same vacuum as the rotary material drum. Since the system operates under a sealed vacuum, the majority of air flow through the system is eliminated. Therefor, no emissions permit is required in most states under exemptions. The vacuum is in place before the system heats up, and the vacuum pump is protected by a condenser 20, filter and molecular sieve.

From the holding tank 52 the recovered liquids are recovered for recycling or disposal. Any uncondensible vapors are pulled through the vacuum pump, FIG. 5, 26, to an in-line filter 54, which can be either a carbon adsorption unit or a polymeric filter. This filter will trap any uncondensed contaminates to minimize emission of VOC's to the atmosphere.

After the required processing time has elapsed, the burner and drum are shut down, the sealable chamber door 12 is disconnected from the material drum 10. The drum 10 can then be transported to the soil storage area and its rotation is reversed, so that the auger mechanism conveys the processed soil out of the drum and into a discharge chute 60. The drum is then reloaded with fresh soil and the process repeated in a batch-like fashion until all of the contaminated soil has been cleaned.

For components of a given design, the operating parameters and the required processing time period are initially determined based on a preliminary soil analysis. The required processing time is directly proportional to the soil particle size, cohesiveness, density, moisture content and contaminant concentration level and indirectly proportional to the soil temperature and the vapor pressure of the volatile organic compound. Since the soil is treated in a batch-like fashion, there is no limitation on the processing time.

Moreover, the processing time can be set independent of the drum rotational speed. As those skilled in the art will recognize, clay-like soils will require longer processing time, whereas sandy soil will require shorter processing time. In general, it has been found that a processing time between about 30–90 minutes is adequate for the clean up of most soils contaminated with petroleum products. Initial concentrations of petroleum hydrocarbons as high as 740,000 PPM by weight can be reduced to less than about 10 PPM by weight by processing though a single pass at variable: drum rotations; processing times; and vacuum levels.

Although the preliminary soil analysis provides initial operating parameters and processing time estimates, samples of processed soil should also be periodically analyzed to insure that the operating parameters and processing time are adequate for the particular conditions of the clean up site. In the preferred embodiment, the soil is analyzed after each 50 cubic yards of soil has been processed.

Some of the materials to be processed by this system are: refinery sludge's; filter cake; soils contaminated with pentachlorophenol; creosote; cresol; mercury; PCB's; Petroleum (virgin & refined); PNA's; PAH's; pesticides; coal tar; carbon regeneration; floorsweep; and oil dry. Process time is typically 45 minutes to an hour for an eight (8) to ten (10) cubic yard batch. The system is self-contained, mobile, and operable by a two-person crew. The process can meet best demonstrated available technology standards (BDAT) for most compounds. The unit is unobtrusive and can be set up quickly.

ALTERNATIVE EMBODIMENTS

Figure 7:
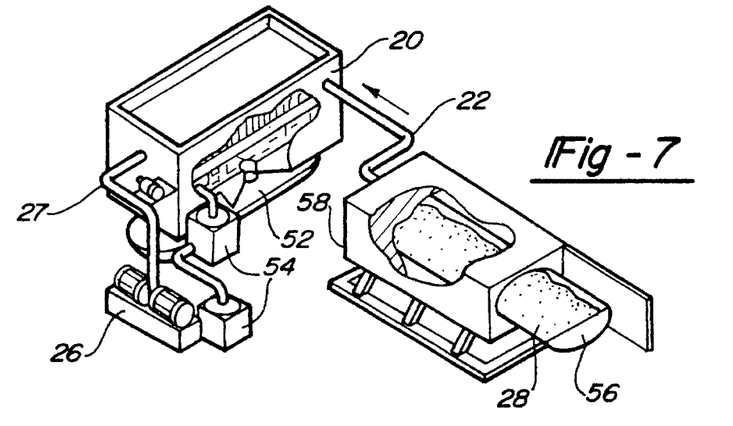
FIG. 7 is an isometric view of an alternative embodiment of the thermal desorption unit.

In the alternative embodiment of the thermal desorption unit, FIG. 7, contaminated soil 28 is loaded and hydraulically sealed in the treatment vessel 56. A vacuum is placed on the material, which is indirectly heated through the heat transfer plate 58 from a natural gas of propane fired burner located under the plate. As the material is heated, contaminants are vaporized and flow through the vacuum discharge pipe 22 toward the condenser unit 20. Vapors are cooled in the condenser 20 through a series of refrigerated condensing coils where the vaporized material is converted back to a liquid 44 and discharged to a liquid recovery vessel 52.

Since the system operates under a sealed vacuum, the majority of air flow through the system is eliminated. The vacuum is in place before the system heats up, and the vacuum pump is protected by a condenser 20, filter and molecular sieve. After treatment, material is downloaded into a roll-off type container for post-treatment analysis and cool down prior to recycling or backfilling. Recovered liquids are recycled or sent to an appropriate facility. Process time is typically 45 minutes to an hour for a six cubic yard batch. The system is self-contained, mobile, and operable by a two-person crew.

Recovery of mercury or lead is also possible in the preferred system. The mechanism of extracting the contaminates works in the same manner. However a molecular sieve 25 is fitted just before the condenser unit 40. The mercury or lead contaminates will bond to the sieve directly. There they will be recoverable as solid matter. If any other contaminates are present in the soil they will pass through the sieve and be condensed in the condensing unit 40. The sieve may be of a polymer type.

It should also be possible to recover oil from coal or shale in the same manner.

Figure 9:
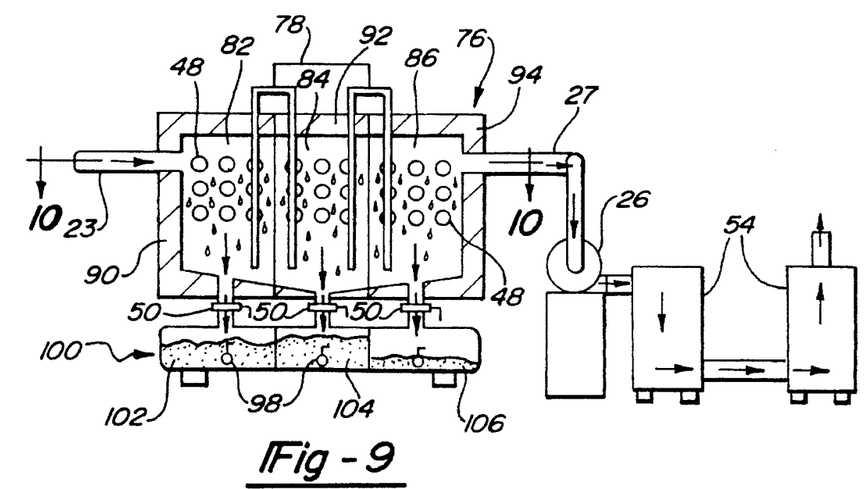
FIG. 9 is a cross sectional view of the modified selective condenser unit.
Figure 10:
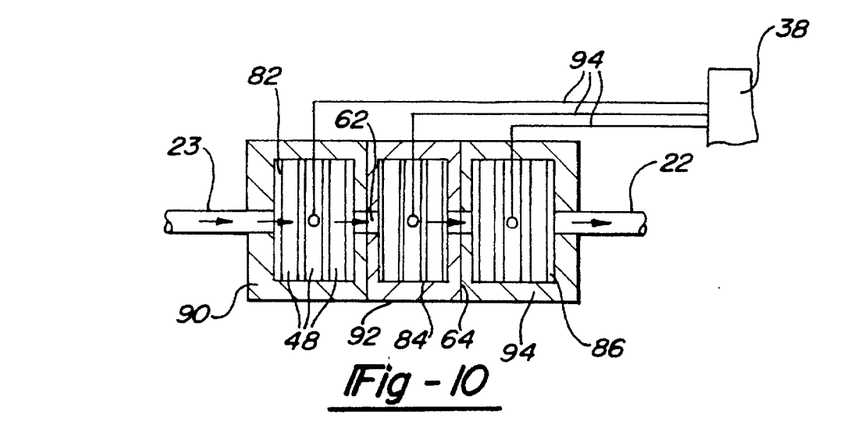
FIG. 10 is a top cross sectional view of the modified selective material container and the condenser unit.

Contaminates can be selectively condensed using the modified selective condenser unit, FIG. 9. This unit provides multiple chambers for condensation of contaminates at different temperatures. The number of chambers will depend on what contaminates are to be separated out. In one embodiment of the invention the selective condenser unit 76, is configured with three condenser compartments 82, 84, 86, each containing lateral conduit tubes 48. The temperature in each of the compartments is controlled with a thermal couple, FIG. 10, 94, which connects to the control panel 38. The unit may be set up so that the first compartment 82 is maintained at 100° F., 37.78° C., the second compartment 84 is maintained at 75° F., 23.89° C. and the third compartment is maintained at 40° F., 4.44° C. Vaporized contaminates would enter the unit through inlet pipe 23 and contaminates with a high boiling point will liquify in compartment, FIG. 9, 82, flow through valve 50 into the first compartment 102 of the compartmentalized recovery tank 100. Any uncondensed vapors flow through transfer tube, FIG. 10, 62, to compartment 84 where contaminates with a lower boiler point are liquified and collected in compartment 104. The remainder of the uncondensed vapors flow through transfer tube 64 into compartment 86 where the vast majority of the remaining contaminated vapors will liquify and can be collected in compartment 106. Any uncondensed vapors will flow out of the modified selective condenser unit 76 through pipe 27 and into filter 54 to further minimize release of unwanted vapors to the atmosphere.

While the compartmentalized holding tank 100 is shown as a single unit it is also possible that separate tanks can be used with the modified selective condenser unit 76 and the compartmentalized holding tank 100 or the individual tanks can be fitted with rollers, FIG. 8, 74. Each holding tank may also be fitted with a drain valve 98 to facilitate removal of contaminated liquids. The modified selective condenser unit can be fitted to a trailer 72 so that it can be readily transported to the contaminated site.

SUMMARY OF THE ACHIEVEMENT OF THE OBJECTS OF THE INVENTION

From the foregoing, it is readily apparent that I have invented an improved method and apparatus for removing chemical contaminants from soil faster and more economically than heretofore has been possible.

It is to be understood that the foregoing description and specific embodiments are merely illustrative of the best mode of the invention and the principles thereof, and that various modifications and additions may be made to the apparatus by those skilled in the art, without departing from the spirit and scope of this invention, which is therefore understood to be limited only by the scope of the appended claims.

What is claimed is:

1. A method for removing contaminates from chemically contaminated material, comprising the steps of:
    a) providing a sealable vessel:
    b) providing a means for loading the vessel;
    c) loading contaminated material into the vessel;
    d) sealing the vessel;
    e) evacuating the vessel;
    f) vaporizing the contaminants by heating the vessel;
    g) transporting the vaporized contaminants through a vacuum discharge pipe toward a condenser unit;
    h) providing a molecular sieve prior to the condenser unit;
    i) separating metals having a low boiling point from the vaporized contaminants within the molecular sieve for later removal;
    j) converting the remaining vaporized contaminants to a liquid state; and
    k) discharging the liquid.

2. A method according to claim 1, wherein heating of the vessel is accomplished by:
    a) providing a heat transfer element;
    b) providing means for heating the heat transfer element; and
    c) heating said heat transfer element directly; thereby causing the contaminated material to be heated indirectly.

3. A method according to claim 1, wherein evacuating the vessel is accomplished by:
    a) providing a vacuum pump; and
    b) reducing the pressure within the vessel with the vacuum pump.

4. A method according to claim 1, wherein heating the vessel is accomplished by:
    a) providing a heat transfer element within the vessel;
    b) heating said heat transfer element directly; thereby causing the contaminated material to be heated indirectly;
    c) providing an auger mechanism within the vessel; and
    d) rotating the vessel causing a churning and grinding of the contaminated material through the interaction of the auger mechanism and the heat transfer element with contaminated material.

5. A method for removing contaminants from chemically contaminated material, comprising the steps of:
    a) providing a sealable vessel:
    b) providing a means for loading the vessel;
    c) loading contaminated material into the vessel;
    d) sealing the vessel;
    e) evacuating the vessel;
    f) vaporizing the contaminants by heating the vessel;
    g) transporting the vaporized contaminants through a vacuum discharge pipe toward a condenser unit;
    h) converting the vaporized contaminants to a liquid state by;
        i) providing a condensing unit having multiple compartments, each compartment containing condensing coils;
        ii) providing means for regulating temperature in each compartment;
        iii) introducing the vaporized contaminants into the condensing unit;
        iv) cooling the condensing coils in each compartment;
        v) condensing the contaminants from each compartment to a liquid upon contact with a coil; and
    i) discharging the liquid.

6. A method according to claim 5, wherein evacuating the vessel is accomplished by:
    a) providing a vacuum pump; and
    b) reducing the pressure within the vessel with the vacuum pump.

7. A method according to claim 5, wherein heating the vessel is accomplished by:
    a) providing a heat transfer element within the vessel;
    b) heating said heat transfer element directly; thereby causing the contaminated material to be heated indirectly;

c) providing an auger mechanism within the vessel; and d) rotating the vessel causing a churning and grinding of the contaminated material through the interaction of the auger mechanism and the heat transfer element with contaminated material.

8. Apparatus for removing contaminants from chemically contaminated material, comprising:

a) a sealable vessel:

b) means for loading said vessel in communication with said vessel;

c) means for sealing said vessel;

d) means for evacuating said vessel;

e) means for heating said vessel, vaporizing the contaminants and forming a vapor stream;

f) means for separating metals from the vapor stream;

g) means for condensing vaporized contaminants;

h) means for transporting vaporized contaminants from said vessel to said means for condensing vaporized contaminants; and i) means for collecting the condensed vaporized contaminants.

9. Apparatus according to claim 8, wherein said means for separating metals is a molecular sieve.

10. Apparatus according to claim 8, wherein said means for separating metals is a polymer molecular sieve.

11. Apparatus according to claim 8, wherein said heating means is selected from the group consisting of: a natural gas burner; a #2 fuel oil burner; a propane fired burner; and a burner fueled by volatile organic compounds recovered from said chemically contaminated material.

12. Apparatus according to claim 8, further comprising:

a) an auger mechanism disposed in said rotatable vessel, said auger mechanism having means for grinding and churning the contaminated material when said auger mechanism is rotated in a first direction, thereby facilitating volatilization of the contaminants;

b) means for transporting said contaminated material into said rotatable vessel when said vessel is rotated in a first direction;

c) means for transporting said contaminated materials out of said rotatable vessel when said vessel is rotated in a second direction.

13. Apparatus according to claim 8, wherein said evacuating means is a vacuum pump.

14. Apparatus according to claim 8, wherein said sealable vessel is a modified drum of a cement truck.

15. Apparatus for removing contaminants from chemically contaminated material, comprising:

a) a sealable vessel:

b) means for loading said vessel with contaminated material in communication with said vessel;

c) means for sealing said vessel;

d) means for evacuating said vessel;

e) means for heating said vessel and forming vaporized contaminants;

f) means for transporting vaporized contaminants from said vessel to said means for condensing vaporized contaminants;

g) means for condensing vaporized contaminants, comprising:

i) a condensing unit having multiple compartments, ii) means for regulating temperature in each compartment, iii) means for introducing contaminated material into the condensing unit, iv) means for allowing contaminated vapors to flow from compartment to compartment, and v) means for collecting condensed contaminated material; and h) means for collecting said condensed vaporized contaminants.

16. Apparatus according to claim 15, wherein said heating means is selected from the group consisting of: a natural gas burner; a #2 fuel oil burner; a propane fired burner; and a burner fueled by volatile organic compounds recovered from said chemically contaminated material.

17. Apparatus according to claim 15, further comprising:

a) an auger mechanism disposed in said rotatable vessel, said auger mechanism having means for grinding and churning said contaminated material when said auger mechanism is rotated in a first direction, thereby facilitating volatilization of contaminants from contaminated materials;

b) means for transporting said contaminated materials into said rotatable vessel when said vessel is rotated in a first direction;

c) means for transporting said contaminated materials out of said rotatable vessel when said vessel is rotated in a second direction.

18. Apparatus according to claim 15, wherein said evacuating means is a vacuum pump.

19. Apparatus according to claim 15, wherein said sealable vessel is a modified drum of a cement truck.

20. Apparatus for removing contaminants from chemically contaminated material, comprising:

a) a sealable vessel:

b) means for loading said vessel with contaminated material in communication with said vessel;

c) means for sealing said vessel;

d) means for evacuating said vessel;

e) means for rotating said vessel;

e) means for heating said vessel, comprising;

i) a source of heat;

ii) a heat transfer element within said vessel communicating with said heat source for directly heating said heat transfer element and indirectly heating the contaminated material;

iii) an auger mechanism within the vessel, whereby interaction of said auger mechanism and said heat transfer element with contaminated material causes a churning and grinding of contaminated material;

f) means for transporting vaporized contaminants from said vessel to said means for condensing vaporized contaminants;

g) means for condensing vaporized contaminants in communication with said sealable vessel;and h) means for collecting condensed vaporized contaminants.

21. Apparatus according to claim 10, wherein said heating means is selected from the group consisting of: a natural gas burner; a #2 fuel oil burner; a propane fired burner; and a burner fueled by volatile organic compounds recovered from said chemically contaminated material.

22. Apparatus according to claim 10, further comprising:
a) an auger mechanism disposed in said rotatable vessel, said auger mechanism having means for grinding and churning said contaminated material when said auger mechanism is rotated in a first direction, thereby facilitating volatilization of contaminants from said contaminated materials;
b) means for transporting said contaminated materials into said rotatable vessel when said vessel is rotated in a first direction;
c) means for transporting said contaminated materials out of said rotatable vessel when said vessel is rotated in a second direction.

23. Apparatus according to claim 10, wherein said evacuating means is a vacuum pump.

24. Apparatus according to claim 10, wherein said sealable vessel is a modified drum of a cement truck.

* * * * *